Nov. 18, 1969  H. R. CLARK  3,478,908
PICKUP CAMPER AND TRAILER TOP BOAT LOADER
Filed Jan. 29, 1968
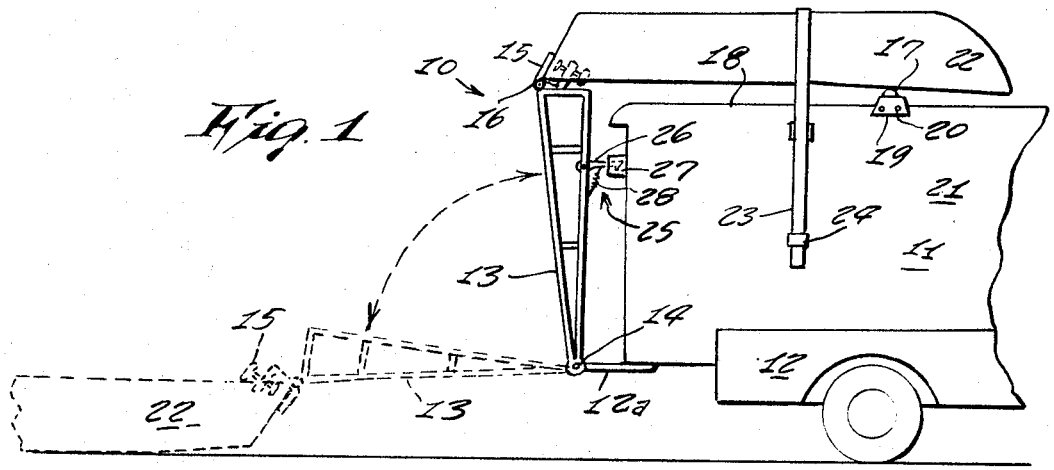
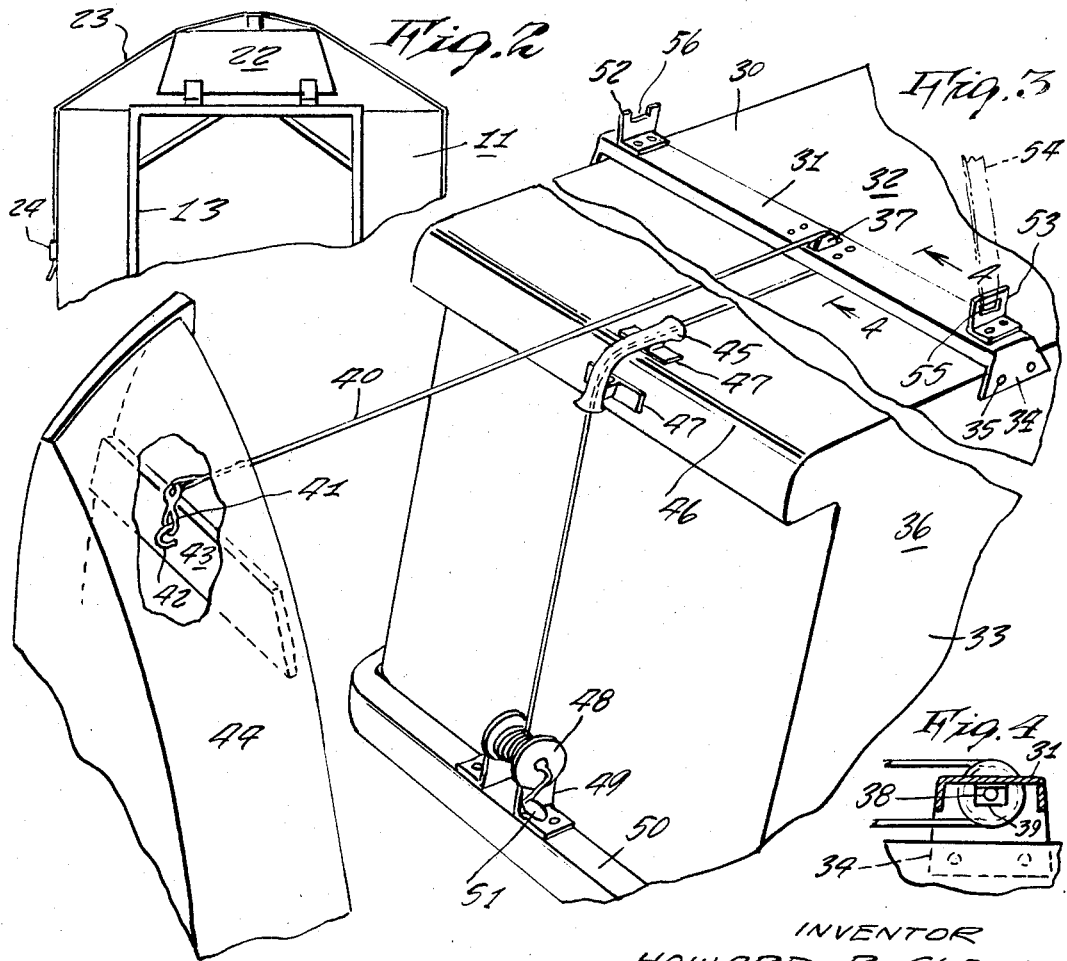
INVENTOR
HOWARD R. CLARK 3,478,908
PICKUP CAMPER AND TRAILER TOP
BOAT LOADER
Howard R. Clark, 1025 S. 24th, Saginaw, Mich. 48601
Filed Jan. 29, 1968, Ser. No. 701,435
Int. Cl. B60r 9/04; B60p 3/10
U.S. Cl. 214—450                                    1 Claim

ABSTRACT OF THE DISCLOSURE

A pickup camper and trailer top having a boat loading device for placing a boat upon the top thereof and transporting it, the boat loading device including a winch and frame for raising the boat, and in another form including a pivotable frame.

This invention relates generally to boat transporting means. More specifically, it relates to pickup campers and trailer tops upon which a small boat may be loaded and carried.

A principal object of the present invention is to provide a pickup camper having self-contained means for raising a boat and placing the same upon the roof thereof for purposes of transportation.

Another object of the present invention is to provide a pickup camper and trailer top wherein the boat may be loaded thereupon where requiring only one person to accomplish the job, and wherein the loading may be accomplished in a minimum amount of time.

Yet a further object of the present invention is to provide a pickup camper and trailer top wherein the boat may be equally easily taken down from the roof thereof by a single person in a minimum amount of time.

Other objects of the present invention are to provide a pickup camper and trailer top boat loader which is simple in design, inexpensive to manufacture, rugged in construction, easy to use and efficient in operation.

These and other objects will be readily evident upon a study of the following specification and accompanying drawing wherein:

FIGURE 1 is a side elevation view of the present invention.

FIGURE 2 is a fragmentary rear elevation view thereof.

FIGURE 3 is a fragmentary perspective view showing a modified form of the present invention.

FIGURE 4 is a cross sectional view taken along the direction of 4—4 of FIGURE 3.

Referring now to the drawing in detail, the reference numeral 10 represents a pickup camper and trailer top boat loader according to the present invention wherein there is a pickup camper 11 upon a truck body 12, as shown in FIGURE 1 of the drawing.

In the present form of the invention, the pickup camper includes a rearwardly extending bracket 13 to which there is pivotly attached a loader frame 13. The loader frame 13 is pivotable between the position indicated by the solid lines in FIGURE 1 and the position indicated by the phantom lines in the same figure. The bracket 12 may comprise the bracket supporting a rear bumper of the vehicle. The loader frame is pivotable about a hinge pin 14 between the positions indicated. At its opposite end, the loader frame carries a clamp 15 pivotally secured thereto by means of a hinge 16.

A rotatable top bar or top roller 17 extends transversely across the roof 18 of the pickup camper, the roller being journaled at its opposite ends within a bracket 19 secured by means of bolts 20 to the opposite sides 21 of the pickup camper. The roller 17 comprises a means upon which one end of a boat 22 may be supported when transported upon the pickup camper roof. It will be noted that the roller 17 is in spaced relation from the roof 18 so as to not frictionally engage the same.

One end of a strap 23 is rigidly secured to a bracket upon one side of the pickup camper, the strap 23 then being passed across the boat 22 loaded upon the pickup camper, the opposite end of the strap being secured to a hold down bracket 24.

A positive lock 25 is provided for locking the loader frame 13 in an upright position, the positive lock 25 comprising a latch pin 26 receivable within a lock 27, the latch pin being normally held pivotally free upon the loader frame and urged into locking position by means of a tension coil spring 28.

In operative use, as shown in FIGURE 1 of the drawing, one end of the boat 22 is attached to the clamp 15. This is accomplished while the boat is upon the ground and as indicated by the phantom lines. The opposite end of the boat is then raised to slide upon the top of the pickup camper, the loader frame being elevated into its raised position and secured thereto by means of the positive lock 25. The strap 23 is then secured across the boat as shown in FIGURE 2 of the drawing and secured by the strap being engaged within the hold down bracket 24. The boat is now ready for transportation.

In a modified construction shown in FIGURE 3 of the drawing, the boat loading device 30 includes a channel 31 extending in spaced apart relation in a transverse direction across the roof 32 of the pickup camper 33, the channel 31 being secured in position by means of a bracket 34 at its opposite ends which is fastened by bolts 35 to opposite sides 36 of the pickup camper. As is shown in FIGURE 4 of the drawing, a pulley 37 is rotatable about a pulley shaft 38 which is journaled within brackets 39 at opposite ends of the shaft 38, the brackets 39 being secured to the underside of the channel 31.

A rope 40 is passed around the pulley 37, one end of the pulley being connected to a snap hook 41 which is removably securable to a hook 42 mounted upon the underside of a seat 43 in the boat 44, the opposite end of the rope 40 extending through an L-shaped guide tube 45 mounted upon the rear edge 46 of the pickup camper roof and providing a means for the rope to clear the edge 46 in a friction-free manner. The guide tube 45 is mounted upon brackets 47 affixed to the pickup camper. The terminal end of the rope 40 is wound upon a winch 48 mounted upon brackets 49 fastened to the rear bumper 50. A crank handle 51 supplies manual means for taking up the rope 40 so as to load the boat upon the pickup camper. Otherwise if preferred, the winch may be motor driven through a power take off from the vehicle engine.

A bracket 52 and a bracket 53 mounted upon opposite ends of the channel 31, provide means for securement thereto of a strap 54 anchored at one end within loophole 55 and passed over notch 56 of the other bracket, the strap 54 then being secured at its terminal end within a hold down bracket similar to bracket 24 shown in FIGURE 1 of the drawing.

The present invention may include various other modified constructional features not shown in the drawing, if preferred. For example, the channel 31 may be made in two parts slideable into each other telescopically so to be readily adjustable in width to correspond to a roof of a pickup camper. Likewise, the loader frame 13 may be made telescopically adjustable so as to clear a rear door upon the pickup camper body. Additionally if preferred, the loader frame may be made also adjustable in height by comprising telescopic members. Thus, the present invention may be readily made adjustable and variable for various conditions.

While various changes may be made in the detailed construction, it is understood that such changes will be within the spirit and scope of the present invention as is defined by the appending claim.

What I now claim is:

1. In a pickup camper and trailer top boat loader, the combination of a mechanism securable to a pickup camper, said mechanism comprised of a means for raising a boat from the surface of the ground to a position above a roof of said pickup camper, and means for securing said boat in a position above said pickup camper roof for purpose of transportation, said means for raising said boat comprising a loader frame secured pivotally free at one end to the bumper bracket of the rear bumper, said loader frame being pivotable between a vertical and horizontal position, said loader frame having a clamp secured hingeably to an opposite end of said loader frame, said frame providing a means for securement to one end of the boat, a transverse extending channel being supported in spaced apart relation across said pickup camper roof, said channel being secured at its opposite ends to brackets secured to opposite side walls of said pickup camper, said channel carrying a pulley rotatable about a shaft secured within brackets mounted upon the underside of said channel and a rope having a snap hook at one end being fastened around through the pulley and through an L-shaped guide tube over the rear upper edge of said pickup camper, the opposite end of said rope being attached to a winch mounted upon said rear bumper.

References Cited

UNITED STATES PATENTS

| | | | |
|---|---|---|---|
| 2,812,087 | 11/1957 | Zoller | 214—85.1 X |
| 2,967,635 | 1/1961 | Barnett | 214—450 |
| 3,072,274 | 1/1963 | Atwell | 214—450 |
| 3,301,421 | 1/1967 | Lutters | 214—450 |

HUGO O. SCHULZ, Primary Examiner